US011977830B2

(12) United States Patent
Liu et al.

(10) Patent No.: US 11,977,830 B2
(45) Date of Patent: May 7, 2024

(54) DEMAND-BASED DEPLOYMENT OF FONT SERVER TO AN EDGE DEVICE

(71) Applicant: INTERNATIONAL BUSINESS MACHINES CORPORATION, Armonk, NY (US)

(72) Inventors: Su Liu, Austin, TX (US); Luis Osvaldo Pizana, Austin, TX (US); Boyi Tzen, Taipei (TW); Fan Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/931,627

(22) Filed: Sep. 13, 2022

(65) Prior Publication Data
US 2024/0086617 A1 Mar. 14, 2024

(51) Int. Cl.
G06F 40/109 (2020.01)
(52) U.S. Cl.
CPC .................. G06F 40/109 (2020.01)
(58) Field of Classification Search
CPC ....................................................... G06F 40/109
See application file for complete search history.

(56) References Cited

U.S. PATENT DOCUMENTS

| 6,065,008 A * | 5/2000 | Simon | G06F 21/10 707/999.009 |
| 7,492,365 B2 * | 2/2009 | Corbin | G06F 40/109 345/468 |
| 7,657,887 B2 * | 2/2010 | Kothandaraman | H04L 67/06 717/176 |
| 7,768,513 B2 * | 8/2010 | Klassen | G06T 11/203 345/468 |
| 8,412,791 B2 * | 4/2013 | Agarwalla | H04L 67/34 709/201 |
| 8,615,709 B2 * | 12/2013 | Lee | G06F 40/10 715/269 |
| 8,689,101 B2 * | 4/2014 | Fux | G06F 40/109 715/269 |

(Continued)

FOREIGN PATENT DOCUMENTS

| CN | 112105035 A | * 12/2020 | ............ H04W 16/18 |
| CN | 115661183 A | * 1/2023 | |

(Continued)

OTHER PUBLICATIONS

Akamai, "What is a CDN (Content Delivery Network)? | Akamai Our Thinking", https://www.akamai.com/our-thinking/cdn/what-is-a-cdn, retrieved from the Internet May 25, 2022 (6 pages) (Year: 2022).

(Continued)

Primary Examiner — Benjamin Smith
(74) Attorney, Agent, or Firm — Tihon Poltavets, Esq; Kevin P. Radigan, Esq.; Heslin Rothenberg Farley & Mesiti P.C.

(57) ABSTRACT

Demand-based deployment of a font server to an edge device is facilitated by identifying a need for font-related data that is currently unavailable at a user device. The process also includes deploying a font server to an edge device of the computing environment to facilitate distribution of the font-related data to the user device.

12 Claims, 9 Drawing Sheets

(56) References Cited

U.S. PATENT DOCUMENTS

| | | | |
|---|---|---|---|
| 9,177,489 B2* | 11/2015 | Driessen | G09C 5/00 |
| 9,332,046 B2 | 5/2016 | Chan et al. | |
| 9,984,046 B2* | 5/2018 | Ikemoto | G06F 21/10 |
| 10,009,222 B2* | 6/2018 | Liu | H04L 41/0803 |
| 10,122,604 B2 | 11/2018 | Byers et al. | |
| 10,169,448 B2* | 1/2019 | Hernandez | G06F 16/3346 |
| 10,218,566 B2* | 2/2019 | Liu | G06F 11/3433 |
| 10,445,408 B2* | 10/2019 | Sinn | G06F 3/04842 |
| 10,503,811 B2 | 12/2019 | Kaplan et al. | |
| 10,572,575 B2* | 2/2020 | Butler | G06F 21/10 |
| 10,755,031 B2* | 8/2020 | Liu | G06F 40/109 |
| 10,803,231 B1* | 10/2020 | Wang | G06N 3/08 |
| 10,878,172 B1 | 12/2020 | Adamson, III | |
| 11,030,389 B2* | 6/2021 | Kaplan | G06F 40/123 |
| 11,051,226 B1* | 6/2021 | Dowlatkhah | H04W 36/0011 |
| 11,113,450 B2* | 9/2021 | Liu | H04L 67/02 |
| 11,153,366 B2* | 10/2021 | Liu | H04L 67/02 |
| 11,188,450 B2* | 11/2021 | Khan | G06F 8/63 |
| 11,349,710 B1* | 5/2022 | Nelson | H04L 67/10 |
| 11,374,875 B1* | 6/2022 | Abhigyan | H04W 12/084 |
| 11,461,541 B2* | 10/2022 | Kumar | G06N 5/01 |
| 11,631,206 B2* | 4/2023 | Arora | G06T 11/60 345/629 |
| 11,652,756 B2* | 5/2023 | Abhigyan | H04W 12/06 709/224 |
| 11,741,325 B1* | 8/2023 | Yuan | G06K 15/1878 358/1.1 |
| 2003/0084091 A1* | 5/2003 | Agarwalla | H04L 67/563 709/220 |
| 2005/0080801 A1* | 4/2005 | Kothandaraman | H04L 67/02 |
| 2005/0193336 A1* | 9/2005 | Fux | G06F 40/109 715/269 |
| 2005/0275656 A1* | 12/2005 | Corbin | G06F 40/109 345/467 |
| 2007/0153002 A1* | 7/2007 | Klassen | G06T 11/203 345/467 |
| 2010/0245364 A1* | 9/2010 | Klassen | G06F 40/103 345/467 |
| 2012/0124368 A1* | 5/2012 | Driessen | G09C 5/00 713/153 |
| 2013/0215126 A1* | 8/2013 | Roberts | G06Q 30/06 345/522 |
| 2014/0047329 A1* | 2/2014 | Levantovsky | G06F 16/9577 715/269 |
| 2014/0136952 A1 | 5/2014 | Zhu et al. | |
| 2015/0363410 A1* | 12/2015 | Hernandez | G06F 16/3346 707/767 |
| 2016/0004672 A1* | 1/2016 | Sakunkoo | H04L 51/08 715/269 |
| 2016/0078004 A1* | 3/2016 | Butler | G06F 40/109 715/269 |
| 2016/0092410 A1* | 3/2016 | Martin | H04L 51/043 715/269 |
| 2016/0182606 A1* | 6/2016 | Kaasila | G06Q 30/0277 715/269 |
| 2016/0321217 A1* | 11/2016 | Ikemoto | G06F 40/117 |
| 2017/0147535 A1* | 5/2017 | Cao | G06F 3/04842 |
| 2017/0249286 A1* | 8/2017 | Kaplan | G06F 40/126 |
| 2017/0255597 A1* | 9/2017 | Sinn | G06F 3/04842 |
| 2017/0288957 A1* | 10/2017 | Liu | G06F 11/30 |
| 2017/0288958 A1* | 10/2017 | Liu | H04L 43/16 |
| 2018/0039621 A1* | 2/2018 | Sconce | G06F 3/04817 |
| 2018/0124158 A1* | 5/2018 | Amento | H04L 67/63 |
| 2019/0208449 A1* | 7/2019 | Wang | H04W 4/40 |
| 2020/0021640 A1* | 1/2020 | Amento | H04L 67/34 |
| 2020/0073936 A1* | 3/2020 | Jankowski | G06F 40/279 |
| 2020/0089737 A1* | 3/2020 | Kaplan | G06F 40/109 |
| 2020/0089741 A1* | 3/2020 | Liu | G06F 40/126 |
| 2020/0134000 A1* | 4/2020 | Liu | H04L 67/02 |
| 2020/0280602 A1* | 9/2020 | Liu | H04L 67/63 |
| 2020/0311186 A1* | 10/2020 | Wang | G06F 18/2148 |
| 2021/0185583 A1* | 6/2021 | Dowlatkhah | H04W 36/0011 |
| 2021/0297832 A1* | 9/2021 | Dowlatkhah | H04W 4/50 |
| 2021/0311855 A1* | 10/2021 | Khan | G06F 11/362 |
| 2022/0043739 A1* | 2/2022 | Khan | G06F 8/63 |
| 2022/0329481 A1* | 10/2022 | Nelson | G06F 8/61 |
| 2022/0337531 A1* | 10/2022 | Abhigyan | H04W 12/06 |
| 2022/0358280 A1* | 11/2022 | Shirani | G06F 40/109 |
| 2022/0398790 A1* | 12/2022 | Arora | G06T 11/60 |
| 2023/0111816 A1* | 4/2023 | Malboubi | G06F 16/278 726/26 |
| 2023/0164033 A1* | 5/2023 | Lee | H04L 43/0811 709/224 |
| 2023/0246984 A1* | 8/2023 | Abhigyan | H04L 47/82 709/224 |

FOREIGN PATENT DOCUMENTS

| | | | | |
|---|---|---|---|---|
| CN | 116032932 A | * | 4/2023 | |
| JP | 2017102763 A | * | 6/2017 | |
| JP | 6158902 B2 | * | 7/2017 | |
| JP | 2017199393 A | * | 11/2017 | |
| KR | 20160110366 A | * | 1/2013 | |
| WO | WO 2011/127788 A1 | | 10/2011 | |
| WO | WO-2013123129 A1 | * | 3/2013 | G06F 17/214 |
| WO | WO 2018/134942 A1 | | 7/2018 | |
| WO | WO-2018134942 A1 | * | 7/2018 | |

OTHER PUBLICATIONS

Wang et al., "Learning Better Font Slicking Strategies from Data", IPCOM000251988E, published Dec. 13, 2017 (33 pages) (Year: 2017).

* cited by examiner

DEMAND-BASED DEPLOYMENT OF FONT SERVER TO AN EDGE DEVICE

BACKGROUND

One or more aspects relate, in general, to processing within a computing environment, and in particular, to enhanced, demand-based edge server deployment to facilitate distribution of font-related data to a user device.

In a cloud-based environment, edge computing (i.e., computing at or near a boundary) enables processing and/or storage of data to be provided at, or closer to, the device(s) where operations are being performed. Accordingly, edge computing can eliminate the need for data to be processed or stored being transmitted to a central location (e.g., a central cloud server), which may be physically located a significant distance from the device(s). Although this configuration may not provide a substantial change in the services being provided from an individual device perspective, the large increase of Internet of Things (IoT), and other electronic devices, including mobile devices, exponentially increases network requirements when utilizing cloud services, which can cause an increase in latency, potentially resulting in a lower quality of service, higher bandwidth costs, etc. Advantageously, edge computing can assist in alleviating these issues.

The majority of computing devices or electronic devices have computer fonts that use Unicode mappings. This is true, even for fonts which include glyphs for a single writing system, or only support a basic alphabet. A glyph is a single representation of a character, and a font typically has a Unicode character map that links character IDs with how to display that character, using one or more default glyphs.

SUMMARY

Certain shortcomings of the prior art are overcome, and additional advantages are provided herein through the provision of a computer program product for facilitating processing within a computing environment. The computer program product includes one or more computer readable storage media and program instructions embodied therewith. The program instructions are readable by a processing circuit to cause the processing circuit to perform a method which includes identifying a need for font-related data that is currently unavailable at a user device, and deploying a font server to an edge device of the computing environment to facilitate distribution of the font-related data to the user device.

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures.

One or more aspects of an illustrative embodiment can be implemented in, software, hardware, or a combination thereof.

Figure 1:
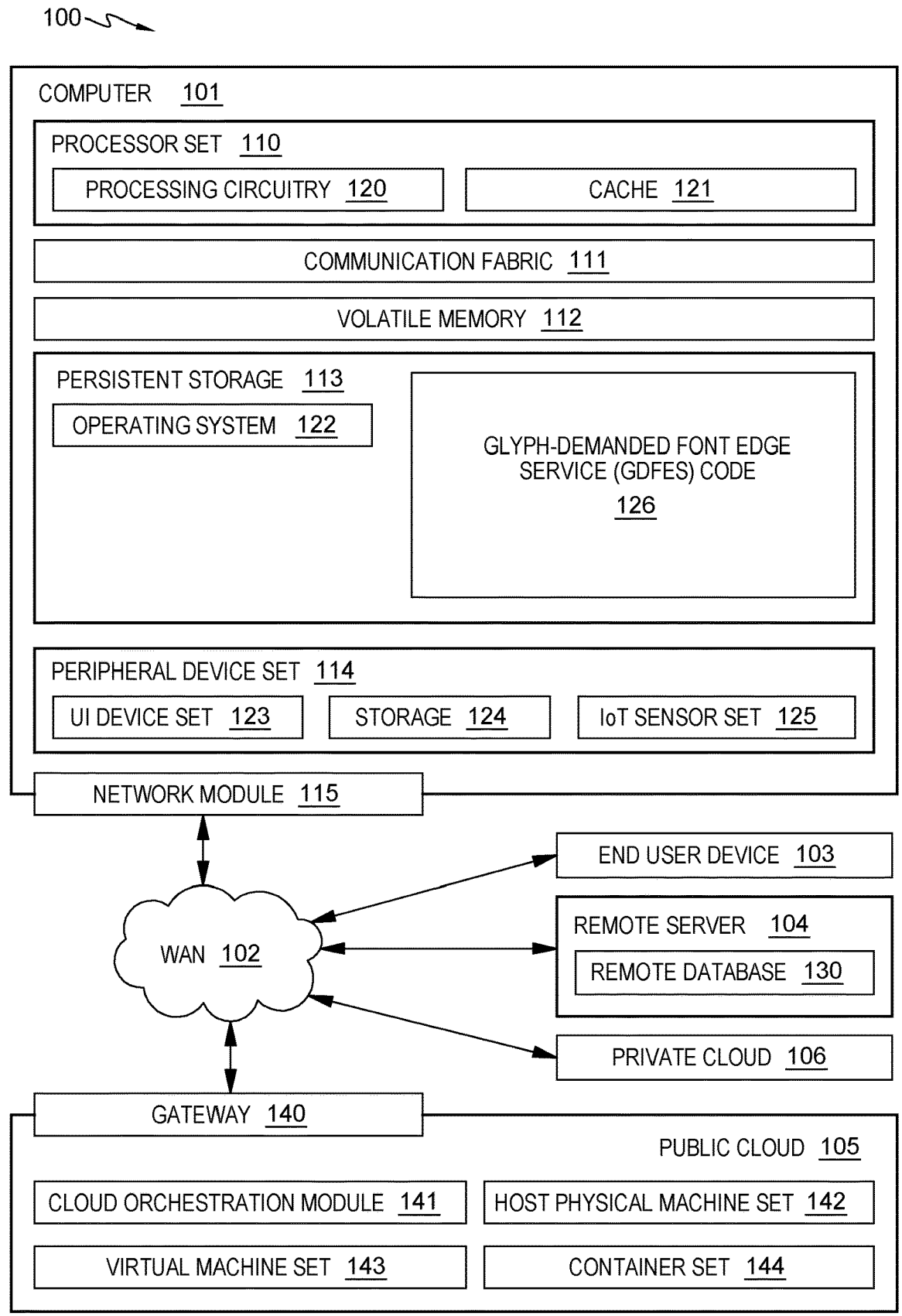
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1 as operating system 122 and glyph-demanded font edge service (GDFES) code 126, which are stored in persistent storage 113, as well as gateway 140, cloud orchestration module 141, virtual machine set 143, and container set 144, which are part of, or associated with, public cloud 105, in the example computing environment 100 of FIG. 1. In another example, program code depicted in the computing environment of FIG. 7 includes, in part, application program(s) 716, operating system 718, GDFES-related code 720, and computer-readable program instructions 722, which are stored in memory 706 of computer system 702.

Containerization is the packaging of software code, for instance to implement a service or microservice, with its dependencies, such as operating system libraries and/or other dependencies, used to run the software code to create a single, lightweight executable, referred to as a container. The container is portable in that it runs consistently and reliably on any information technology infrastructure. In one or more embodiments, the software code can be an application, such as a font server or edged-font server described herein. A container can be created from a container image, which is a file that includes executable program code that can be run as an isolated process on a computing or information technology (IT) infrastructure. One image can be used to run one or more containers, which are runtime instances of the container image. Containers are lightweight (e.g., they share the machine's operating system), efficient, easy to manage, secure, and portable.

One example of a product used to provide and manage containers is Kubernetes®, which is an open-source system for automating deployment, scaling and management of containerized applications. (Kubernetes® is a Registered Trademark of the Linux Foundation in at least one jurisdiction.) Kubernetes groups containers that make up an application into logical units for easy management and discovery. In operation, Kubernetes orchestrates a containerized application to run on a cluster of hosts (or nodes), and automates deployment and management of cloud-native applications using on-premise infrastructure or public cloud platforms. The Kubernetes system is designed to run containerized applications across a cluster of nodes (or servers or devices), which can be at a single geographic location or distributed across multiple geographic locations. In one or more implementations, a cluster is a set of nodes (whether physical computing resources or virtual computing resources) running Kubernetes agents, managed by the Kubernetes control plane.

Container orchestration is the automation of much of the operational effort required to run containerized workloads and services. Orchestration includes a wide range of processes required to maintain a container's lifecycle, including provisioning, deployment, scaling (up and down), networking, load-balancing, and more. Note that Kubernetes is one example only of a orchestration platform that can be used to manage, for instance, font servers, such as discussed herein.

In one or more embodiments, other platforms, such as Docker™, can be used to facilitate deploying a font server, or edged-font server, in accordance with one or more aspects disclosed. (Docker™ is a Trademark or Registered Trademark of Docker, Inc., of San Francisco, California, USA.)

Prior to describing embodiments of the present invention, an example computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive-related methods, including glyph-demanded font edge service (GDFES) code 126. In addition to block 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 126, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 126 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As noted, a majority of electronic devices (such as computing devices and systems) have computer fonts that use Unicode mappings. This is true, even for fonts that include glyphs for a single writing system, or that only support a basic alphabet. A glyph is a single representation of a character, and a font typically has a Unicode character map that links character IDs with how to display that character, using one or more default glyphs. The typography of a user application can be a significant aspect to delivering a great user experience. This means that displaying fonts and glyphs in the correct manner can often make or break a user experience with an application. To enhance a user experience, it may be necessary to render, for instance, newly defined emojis, symbols, and/or natural language characters in a user device where the data is currently unavailable, such as in a device that does not have the required glyphs and/or fonts installed.

Figure 2:
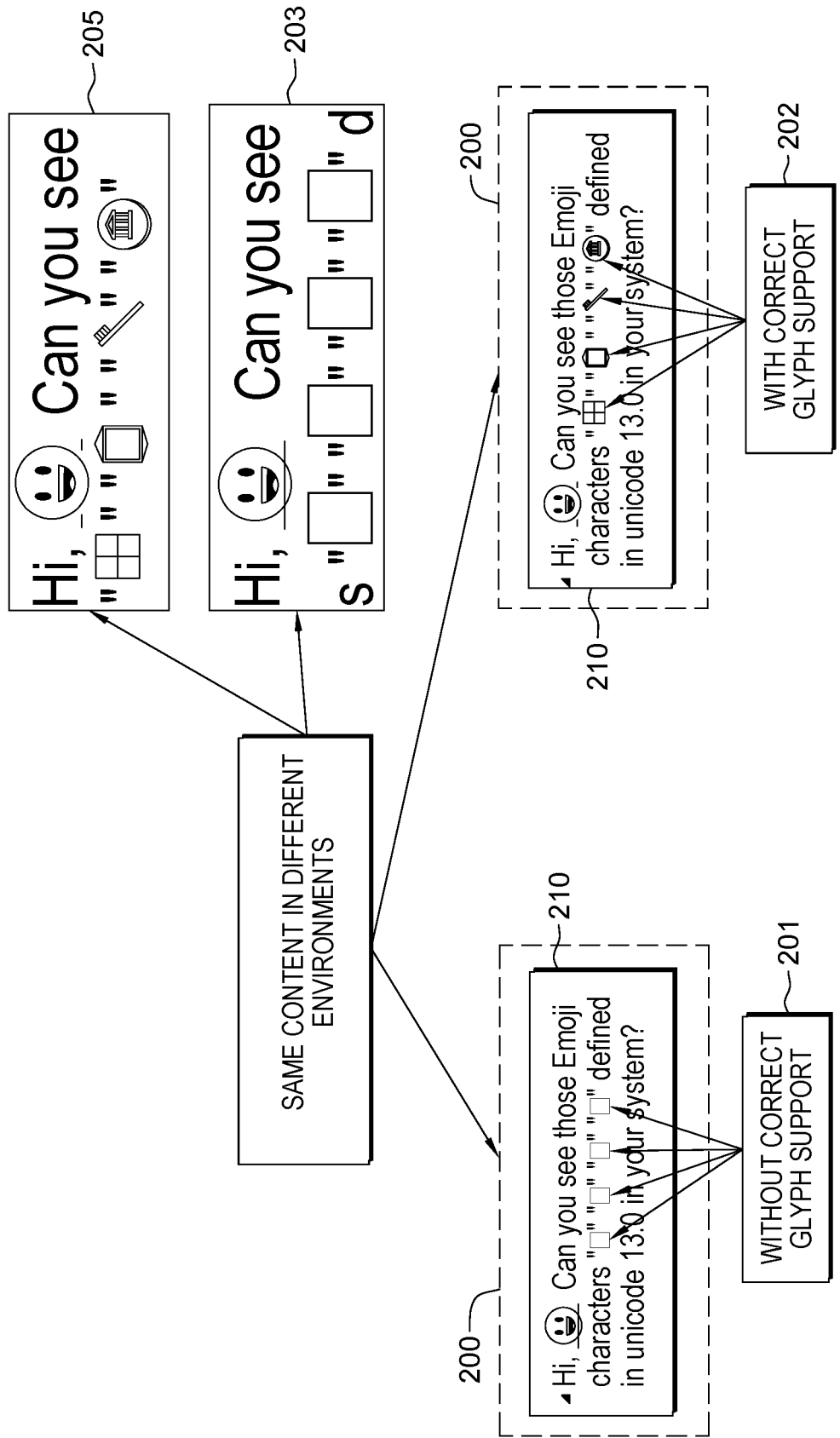
FIG. 2 depicts an example embodiment of a user interface of a user device, where there is a need for font-related data that is currently unavailable at the user device, which is to be addressed in accordance with one or more aspects of the present invention.

An example embodiment of this is depicted in FIG. 2, where a user device 200, or user electronic device, such as a mobile device, includes a user interface 210, such as an electronic device display. In one or more implementations, the computing environment of FIG. 2 can be, for instance, part of computing environment 100 of FIG. 1. As shown, without correct glyph support 201, certain emoji characters are unable to be displayed 203, while with correct glyph support 202, the glyphs within the content are able to be correctly displayed 205 within user interface 210, as illustrated. Note that the content is the same in both cases, but without the correct glyph support, certain emoji characters are unable to be shown in user interface 210. In accordance with one or more aspects disclosed herein, an edged-font server is provided to supply the needed font-related data that is currently unavailable at the user device for the correct rendering of, for instance, emoji characters (or other glyphs or fonts), for instance, without installing a fully updated font package or font file on the user device. With Unicode adding emoji characters every year, the need for expanded font-related data to support, for instance, the new emoji characters, can be significant.

One approach to addressing this issue is to provide a centralized font server, which can be updated with a new font file with every update to, for instance, available emoji characters or other glyphs or fonts. With a centralized font service implementation, a client request is needed, and with static pre-installed font files on the user device, it can be a challenge to know or predict which further fonts the client needs from the centralized font server. Further, font loading time from a central server can be unpredictable, and with the size of font files typically being large, application performance could be negatively impacted by the resultant delay time.

As an alternative, disclosed herein is a glyph-demanded font edge service (GDFES) or process which, in part, identifies a need for font-related data that is currently unavailable in a user device, and deploys a font server to an edge device of the computing environment to facilitate distribution of the font-related data to the user device. The edge device is, in one or more embodiments, an edge device to the user's device, which facilitates the transfer of the demanded font-related data to the user electronic device. Note in this regard that font-related data such as used herein can refer to required glyphs and/or fonts currently unavailable at the user device. Once the needed font-related data is identified, a font server can be automatically deployed to an edge device of the computing environment to facilitate distribution of the font-related data to the user device. For instance, in one or more implementations, a customized, and lightweight edged-font server can be automatically deployed to the edge device of the computing environment to facilitate user device access to the needed font-related data. In one or more implementations, the needed font-data can be identified in real time by font and/or glyph demand analysis and/or prediction, such as described herein.

Figure 3:
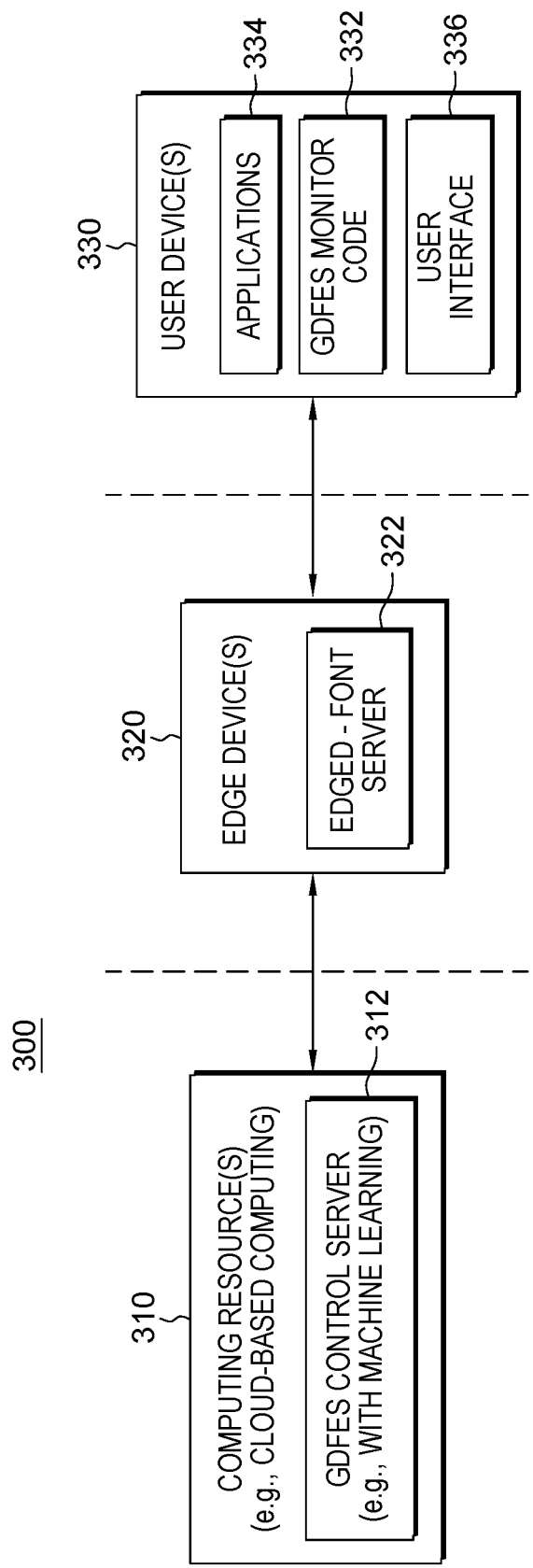
FIG. 3 depicts another embodiment of a computing environment to incorporate and/or use one or more aspects of the present invention.

By way of example, FIG. 3 depicts another embodiment of a computing environment 300 to incorporate and/or use one or more aspects of the present invention. Those skilled in the art will understand that, in one or more embodiments, aspects of computing environment 300 can be the same or similar to those described above in connection with computing environment 100 of FIG. 1. Computing environment 300 depicts, by way of example, a technical environment or system into which various aspects of some embodiments of the present invention can be implemented. By way of example, computing environment 300 includes one or more computing resources 310, such as one or more cloud-based computing resources, as well as one or more edge devices or systems 320, and one or more user devices 330, such as one or more user electronic devices. In one or more embodiments, user device(s) 330 can be, or include, one or more wireless user devices, such as one or more smartphones, mobile phones, gaming devices, wireless vehicle devices/systems, wireless computers, etc., which may in use require font-related data that is currently unavailable at the user device. In one embodiment, computing environment 300 can include a cellular network, such as a next generation cellular network, or 5G network, which wirelessly interfaces various types of user device(s) 330 to edge device(s) 320. For instance, the cellular network can include multiple edge sites, each with a respective cell tower for wirelessly interfacing with various types of user devices within range of the cell tower. One or more of the edge sites can include a radio access network which interfaces an edge site computing infrastructure and, for instance, a next generation (5G) core network. The edge site computing infrastructure can be one example of edge device(s) 320. In one embodiment, the next generation (5G) core network can include, for instance, a user plane function (UPF), which interfaces the radio access network(s) and a data network, such as a local-area network (LAN), a wide-area network (WAN), such as the Internet, or a combination thereof, and which can include wired, wireless, fiber-optic connections, etc. The network(s) can include one or more wired and/or wireless networks that are capable of receiving and transmitting data, such as data related to one or more of the aspects referenced herein.

As discussed, embodiments of the present invention include computer program products, computer-implemented methods, and computer systems, where program code executing on one or more processing circuits, such as processor set 110 of FIG. 1, performs real-time deploying of a font server to an edge device of a computing environment to facilitate distribution of needed font-related data to a user device. The program code can include, in one or more embodiments, a glyph-demanded font edge service (GDFES) control server 312 executing on one or more computing resource(s) 310. Further, in one or more implementations, the program code can include an edged-font server 322 deployed to edge device(s) 320 by GDFES control server 312, as well as GDFES monitor code 332 provided on user device(s) 330, which in the illustrated embodiment, also includes one or more applications 334 and a user interface 336, such as a display interface.

Note that certain embodiments described herein refer to the GDFES process as monitoring or collecting user device data in order to facilitate identifying a need for font-related data that is currently unavailable at a user device. To the extent that an implementation of the invention collects, stores, or employs personal information provided by, or obtained from, individuals, such information shall be used in accordance with all applicable laws concerning protection of personal information. Additionally, the collection, storage and use of such information may be subject to consent of the individual to such activity, for example, through "opt-in" or "opt-out" processes, as may be appropriate for the situation and type of information. Storage and use of information may be in an appropriately secure manner, reflective of the type of information, for example, through various encryption and/or anonymization techniques for sensitive information. In one or more implementations, a user can register to use, and thereby "obtain" a glyph-demanded font edge service (GDFES) or process, such as disclosed herein.

As illustrated in FIG. 3, in one or more implementations, GDFES control server 312 can utilize machine learning, such as for the learning, analyzing and/or predicting processes described herein.

Machine learning (ML) provides computers within an ability to learn, or continue learning, without being pre-programmed. Machine learning utilizes algorithms that learn from data and create insights based on the data, such as for making predictions or decisions. In one or more embodiments, training data in machine learning is the data used to train a model or make a prediction and solve a problem, provide relevant recommendations, perform an action, etc., based on the particular application of the machine learning model.

Briefly described, in one embodiment, computing resource(s) 310 can include one or more processors, for instance, central processing units (CPUs). Also, the processor(s) can include functional components used in the integration of program code, such as functional components to fetch program code from locations, such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). Embodiments of a computing resource(s) (or computer system(s)), which can implement one or more aspects disclosed herein, are described by way of example with reference to FIGS. 1 & 7.

In one embodiment, program code executes a machine learning agent that facilitates training one or more machine learning models. The machine learning models can be trained using one or more training datasets that can include a variety of types of data, depending on the model and the data sources. In one or more embodiments, the program code executing on one or more computing resources 310 applies machine learning algorithms of the machine learning agent to generate and train the model(s), which the program code then utilizes to make a prediction, perform a skill (e.g., provide a solution, make a recommendation, perform an action, etc.). In an initialization or learning stage, the program code trains one or more machine learning models using a received or obtained training dataset that can include, in one or more embodiments, font-related data of a plurality of user devices for one or more applications.

The training data or dataset used to train the model (in embodiments of the present invention) can include a variety of types of data, such as data generated by one or more devices or computer systems in communication with computing resource(s) 310. Program code, in embodiments of the present invention, can perform machine learning analysis to generate data structures, including algorithms utilized by the program code to perform a machine learning skill, function, action, etc. As known, machine learning (ML) solves problems that cannot be solved by numerical means alone. In this ML-based example, program code extracts features/attributes from training data, which can be stored in memory or one or more databases. The extracted features are utilized to develop a predictor function, h(x), also referred to as a hypothesis, which the program code utilizes as a machine learning model. In identifying the machine learning model, various techniques can be used to select features (elements, patterns, attributes, etc.), including but not limited to, diffusion mapping, principle component analysis, recursive feature elimination (a brute force approach to selecting features), and/or a random forest, etc., to select the attributes related to the particular model. Program code can utilize a machine learning algorithm to train the machine learning model (e.g., the algorithms utilized by program code), including providing weights for conclusions, so that the program code can train any predictor or performance function included in the machine learning model. The conclusions can be evaluated by a quality metric. By selecting an appropriate (e.g., a diverse) set of training data, the program code trains the machine learning model to identify and weight various attributes (e.g., features, patterns) that correlate to enhanced performance of the machine-learned model.

Some embodiments of the present invention can utilize IBM Watson® as learning agent. IBM Watson® is a registered trademark of International Business Machines Corporation, Armonk, New York, USA. In embodiments of the present invention, the respective program code can interface with IBM Watson® application program interfaces (APIs) to perform machine learning analysis of obtained data. In some embodiments of the present invention, the respective program code can interface with the application programming interfaces (APIs) that are part of a known machine learning agent, such as the IBM Watson® application programming interface (API), a product of International Business Machines Corporation, to determine impacts of data on the machine learning model, and to update the model, accordingly.

In some embodiments of the present invention, certain of the APIs of the IBM Watson® API include a machine learning agent (e.g., learning agent) that includes one or more programs, including, but not limited to, natural language classifiers, Retrieve-and-Rank (i.e., a service available through the IBM Watson® developer cloud that can surface the most relevant information from a collection of documents), concepts/visualization insights, tradeoff analytics, document conversion, natural language processing, and/or relationship extraction. In an embodiment of the present invention, one or more programs can be provided to analyze data obtained by the program code across various sources utilizing one or more of, for instance, a natural language classifier, Retrieve-and-Rank APIs, and tradeoff analytics APIs.

In some embodiments of the present invention, the program code can utilize a neural network to analyze training data and/or collected data to generate an operational model or machine learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing complex datasets, neural networks and deep learning provide solutions to many problems in multi-source processing, which program code, in embodiments of the present invention, can utilize in implementing a machine learning model, such as described herein.

Figure 4A:
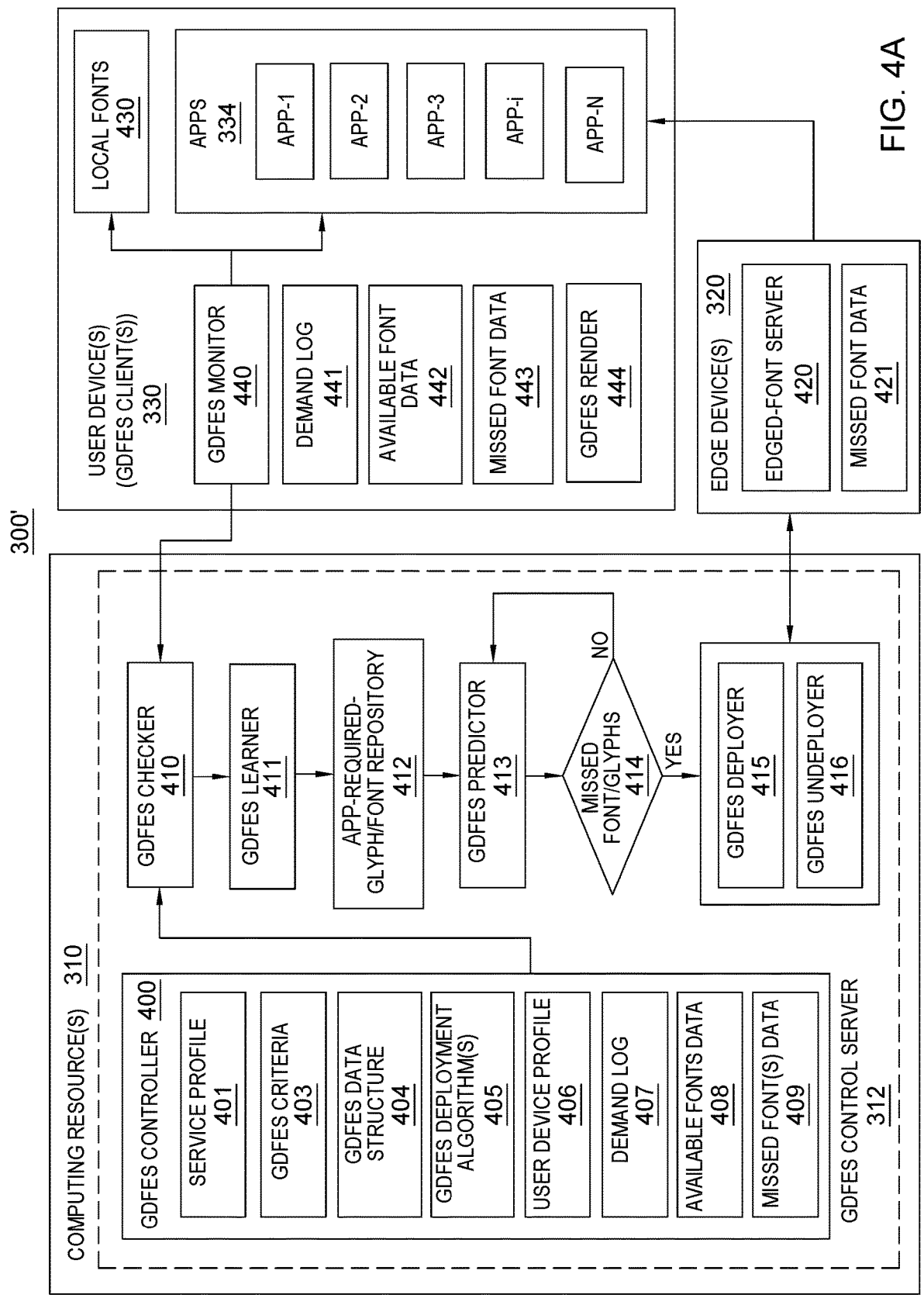
FIG. 4A depicts a more detailed embodiment of a computing environment with a glyph-demanded font edge service (GDFES) pursuant to one or more aspects of the present invention.

FIG. 4A depicts a more detailed implementation of a computing environment 300', such as computing environment 300 described above, which incorporates and/or uses one or more aspects of the present invention. As noted, those skilled in the art will understand that, in one or more embodiments, aspects of computing environment 300' can be the same or similar to those described above in connection with computing environment 100 of FIG. 1. Computing environment 300' depicts, by way of example, a technical environment or system into which various aspects of some embodiments of the present invention can be implemented. Computing environment 300' includes computing resource(s) 310, one or more edge devices 320, and one or more user devices 330, such as described above.

Figure 4B:
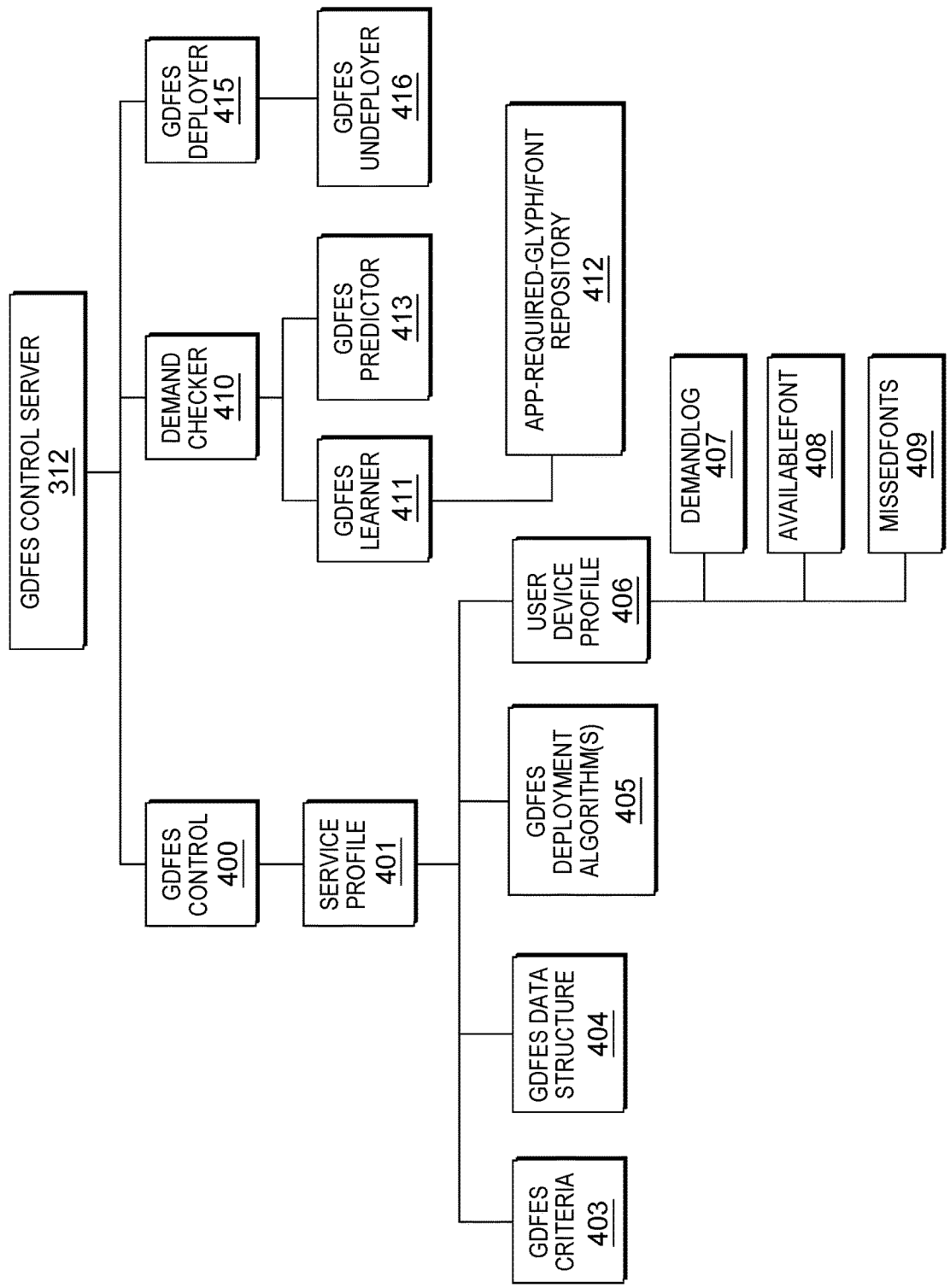
FIG. 4B depicts one embodiment of process components of a control server of a computing environment with the glyph-demanded font edge service of FIG. 4A, in accordance with one or more aspects of the present invention.
Figure 4D:
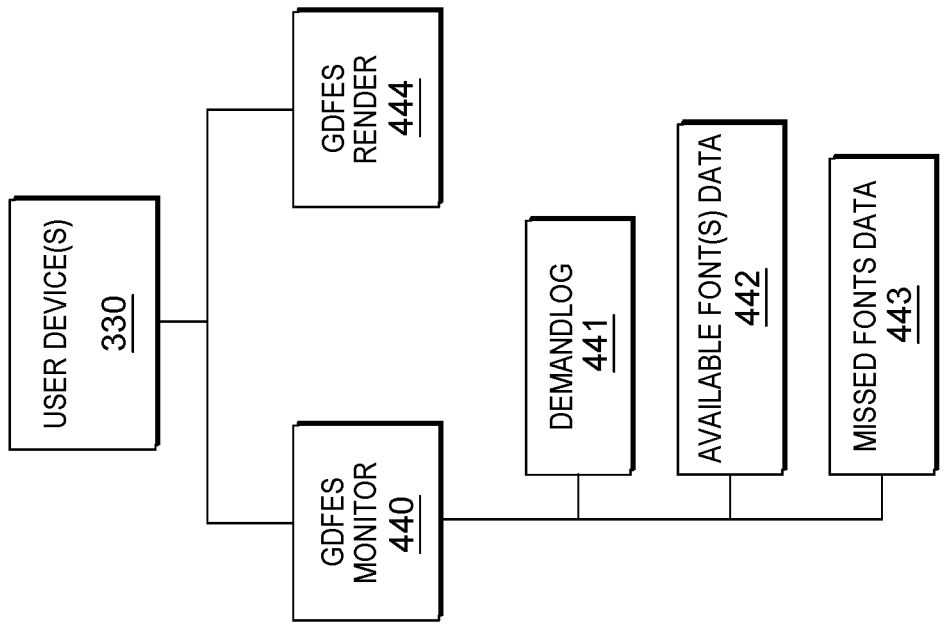
FIG. 4D depicts one embodiment of process components of a user device of a computing environment with the glyph-demanded font edge service of FIG. 4A, in accordance with one or more aspects of the present invention.
Figure 4C:
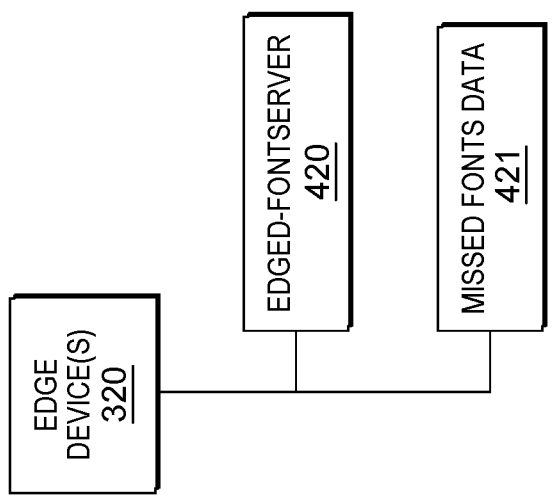
FIG. 4C depicts one embodiment of process components of an edge device of a computing environment with the glyph-demanded font edge service of FIG. 4A, in accordance with one or more aspects of the present invention.

FIGS. 4B-4D depict one embodiment of the GDFES process components or program code of FIG. 4A, with FIG. 4B illustrating process components of GDFES control server 312, FIG. 4C illustrating process components of edge device(s) 320, and FIG. 4D illustrating process components of user device(s) 330.

Referring initially to FIGS. 4A & 4B, GDFES control server 312 can be a sever for controlling a glyph-demanded font edge service or process, such as described herein. GDFES control server 312 includes, in one embodiment, a GDFES control 400 which includes a service or process profile 401. In one or more embodiments, GDFES control 400 and/or service profile 401 include(s), or use, one or more GDFES monitors, such as a GDFES monitor 440 on user device(s) 330, which (for instance) can be, or include, a GUI for administrators and/or users to, at least in part, configure the GDFES process. The configuration(s) can include criteria and related algorithms for controlling deploying of a font server with the correct set of fonts or glyphs to an edge device according to glyph rendering demands of the user device. For instance, the configuration can include when the GDFES control server deploys a font server, what kinds of fonts (or font-related data) are to be deployed, to which edge device, according to what kind of user device demand. For example, where a user device (e.g., via a request) requests a same font-X more than y times, where y≥0, then the GDFES control server can automatically deploy an edge-font server with DeployFont[Font-X]. This information can be stored as part of the GDFES criteria 403. A GDFES data structure 404 can be provided to save and implement font rendering demands to the user device. For example, the data structure can be GDFES_Data (Edged_FontServerID, DeployFont[F1], DemandType[Language][AppID][MissedGlyphList]) [GDRES Data Structure]. As illustrated, the GDFES control 400 can further include a GDFES deployment algorithm 405, as well as user device profile 406, which can include a demand log 407, an available font data structure 408, and a missed fonts data 409, by way of example.

By way of example, GDFES control server 312 can further include a demand checker component 410, which in one embodiment, includes program code for checking a glyph and/or font demand according to the contents of a user device application to be rendered, such as in a launching application on the user device. This can include a GDFES learner component 441, which in one embodiment, includes program code for learning and analyzing relationships between app-required-glyph/fonts across a plurality of user devices, and then creating, based on the analyzing, an app-required-glyph/fonts repository 412, which can be used to customize the edged-font server to be deployed. In one embodiment, the repository can be a database for saving mapping tables of applications and needed fonts/glyphs. For instance, App-1: Font-X could be an entry. Optionally, a GDFES predictor 413 can be provided which, in one embodiment, can include rules-based or machine learning based program code for predicting an application demand for unavailable glyphs and/or fonts in one or more user devices.

The GDFES management server 312 can further include, in one or more implementations, a GDFES deployer 415 and a GDFES undeployer 416. GDFES deployer 415 includes, in one embodiment, program code for deploying an edged-font server to an edge device in communication with the user device. For instance, this can include GDFES deployer [Edge DeviceID, Edged-Fontserver[FSi], FontList]. GDFES undeployer 416 can include, in one or more embodiments, program code for removing an unused edged-font server from an edge device. For instance, this can be GDFES undeployer [Edge DeviceID, Edged-Fontserver[FSi], FontList].

As illustrated in FIGS. 4A & 4C, edge device(s) 320 includes, in one embodiment, a deployed edged-font server 420 to facilitate distribution of needed font-related data to user device(s) 330. In the embodiment illustrated, edge device(s) 320 can further include a missed fonts data 421, which identifies based on attempted use a set of one or more fonts which are not installed in the user device(s).

As illustrated in FIGS. 4A & 4D, the glyph-demanded font edge service (GDFES) can further include user device program code, in addition to one or more applications 334 and one or more local fonts (or local font files) 430 installed on the user device(s) 330. For instance, a GDFES monitor 440 can be provided which, in one embodiment, includes program code executing on the user device to monitor glyph/font usage in one or more applications of the user device, such as all applications of the user device. GDFES monitor 440 can maintain a demand log 441 of required font-related data needed at the user device 330, as well as available font data 442 and missed font data 443. In addition, a GDFES renderer 444 can be provided, and include, in one embodiment, program code for connecting to edged-font server 420 on edge device(s) 320 from user device(s) 330, and for rendering the font-related data needed, such as the required glyph(s) in the user interface of the user device.

Figure 5:
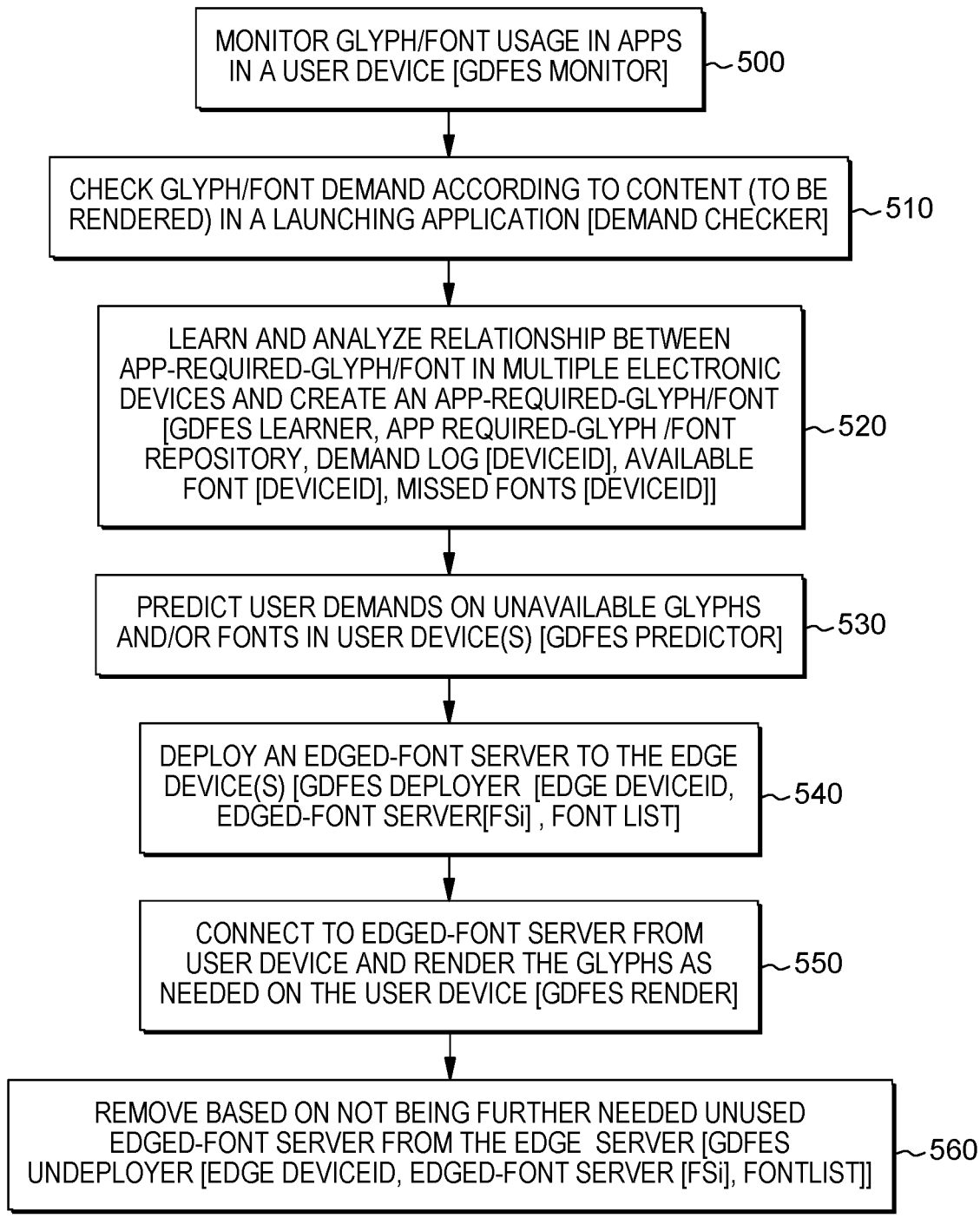
FIG. 5 depicts one embodiment of a workflow, in accordance with one or more aspects of the present invention.
Figure 6:
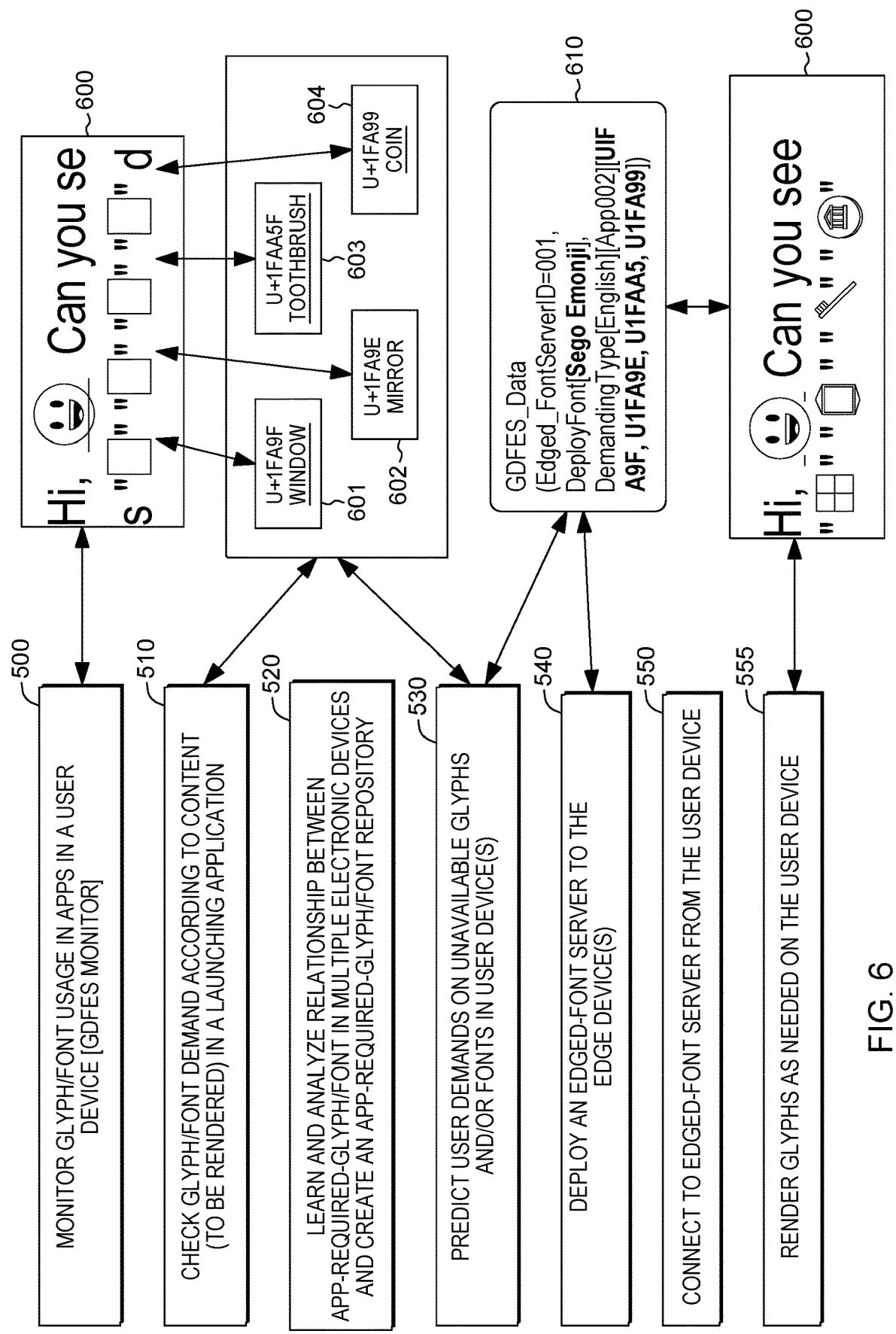
FIG. 6 depicts an example embodiment of the workflow of FIG. 5, in accordance with one or more aspects of the present invention.

FIGS. 5 & 6 depict embodiments of a workflow, in accordance with one or more aspects of the present invention. Referring collectively to FIGS. 5 & 6, the workflow includes, in one embodiment, program code to monitor glyph and/or font usage (i.e., font-related data usage) and one or more applications of a user device, such as all applications of the user device [GDFES Monitor] 500. As illustrated in FIG. 6, there can be a need for certain font-related data that is currently unavailable at the user device. For instance, the code for certain glyphs to be displayed in the user interface 600 may be currently unavailable at the user device.

In one or more implementations, the process checks glyph and/or font demands according to the contents that will be rendered, such as when launching an application on the user device 510. These can include, by way of example only, the missing glyphs of FIG. 6, such as window glyph 601, mirror glyph 602, toothbrush glyph 603, and coin glyph 604.

In one or more implementations, the glyph-demanded font edge service (or process) learns and analyzes the relationship between an app-required-glyph and/or font in one or more user devices, and then creates an app-required-glyph and/or font repository [GDFES Learner, App-Required-Glyph/Font Repository, Demand Log[Device ID], Available Font[Device ID], Missed Fonts[Device ID]] 520.

The GDFES process, in one embodiment, predicts the user or application demands on unavailable font-related data (i.e., glyphs and/or fonts) in the user device(s) [GDFES Predictor] 530. An example of the GDFES_Data 610 predicted as needed at the user device, and that is currently unavailable at the user device, is depicted in FIG. 6.

In one embodiment, the GDFES process deploys an edged-font server to the edge device in communication with the user device [GDFES Deployer [Edge DeviceID, Edged_FontServer[FSi], Font List]] 540 to facilitate providing the needed font-related data 610.

In one or more implementations, the edged-font server connects with the user device 550, which facilitates rendering the glyphs as needed on user interface 600 of the user device [GDFES renderer] 555 (FIG. 6).

As illustrated in FIG. 5, the GDFES process can further include removing or undeploying an unused edged-font server from the edge device that is unused or not accessed for a configured period of time [GDFES Undeployer[Edge DeviceID], Edged-FontServer[FSi], FontList]] 560.

Those skilled in the art will note from the above description that provided herein is a glyph-demanded font edge service (GDFES) or process that utilizes real-time user device font and/or glyph availability information and analysis for enhancing, for instance, a GUI environment on the user device. The process includes a number of aspects, including design and creation of a frame of a glyph-demanded font edge service [GDFES Control Server, GDFES Client]. Further, the process includes defining a criteria and related algorithms for deploying a font server with a correct set of fonts to an edge device according to glyph rendering demands on the user device. For instance, this can include when to deploy a font server, with what fonts or glyphs, and to which edge device, according to what type of demand(s) [GDFES Criteria, GDFES Deployment Algorithm, Edged-FontServer, DeployFont[F1, F2, F3, . . . Fn]]. Further, the process can include defining a GDFES data structure for tracking and analyzing glyph rendering demands in a user device [GDFES_Data (Edged_FontServerID, DeployFont [F1], DemandType[Language][AppID][MissedGlyphList]]. Further, the process can include allowing user configuration of the GDFES process, such as during a configuration stage [GDFES Manager, Service Provide, User Device Profile]. Further, the process can include program code to monitor glyph and/or font usage in one or more applications in a user device [GDFES Monitor], with the monitoring occurring, for instance, at runtime. Further, the process can include checking glyph and/or font demands according to content of an application to be rendered, such as in a launching application on a user device [Demand Checker].

Further, in one or more embodiments, the process includes program code which learns and analyzes relationships between App-Required-Glyph/Font in one or more devices, and then creates an App-Required-Glyph/Font Repository [GDFES Learner, App-Require-Glyph/Font Repository, Demand Log[DeviceID], Available Font[DeviceID], Missed Fonts[Device ID]]. In one or more embodiments, the GDFES process includes program code to predict a user application demand or requirement on currently unavailable glyphs and fonts [GDFES Predictor]. Further, the process includes deploying an edged-font server to the edge device(s), that is, to the edge device in communication with the user device [GDFES Deployer[Edged DeviceID, Edged-FontServer[FSi], FontList]]. Further, the process includes connecting the edged-font server, for instance, from the user device, and rendering glyphs as needed on the user device, with reference to the edged-font server [GDFES Renderer]. Further, in one or more implementations, the GDFES process includes removing an unused edged-font server from the edge device(s) when no longer needed [GDFES Undeployer[Edge DeviceID, Edged-FontServer [FSi], FontList]].

For instance, in one or more implementations, provided herein is glyph-demanded font edge service (GDFES) or program code that utilizes real time user device font and/or glyph availability information and analysis for automatically dynamically providing needed font-related data that is currently unavailable at a user device by deploying an edged-font server to an edge device within the computing environment. The program code can include, in one embodiment, code for predicting user device demands on unavailable glyphs and/or fonts [GDFES predictor], as well as for deploying an edged-font server to an edge device accessible by the user device [GDFES Deployer[Edge DeviceID, Edged-FontServer[FSi], FontList]]. In one implementation, user device connects to the edged-font server to access the needed font-related data and render the missing data, for instance, glyphs, as needed on the user device [GDFES Renderer]. At a point in time when the edged-font server is no longer used, the edged-font server can be removed or undeployed from the edged device [GDFES Undeployer[Edge DeviceID, Edged-FontServer[FSi], FontList]]. Those skilled in the art will note that, in one embodiment, predicting user demand for unavailable glyphs and/or fonts on a user device can be based on, for instance, at least one model of a relationship between a plurality of user devices and a plurality of applications requiring one or more glyphs and/or fonts.

Advantageously, the glyph-demanded font edge service (GDFES) disclosed herein dynamically defines in real-time an edged-font server for deploying to an edge device accessible by the user device requiring font-related data currently unavailable on the user device. The process described is a more efficient process than prior approaches, which reduces font server latency and reduces network traffic. Further, a more accurate process is disclosed with simplified edged-font server selection and simplified related computing workloads. In one or more embodiments, the edged-font server or application is tailored to the user device needs. Further, the process is more secure than other approaches by reducing the amount of personal or sensitive data transfer (such as applications used, selected glyphs, rendered glyphs, etc.). With the glyph demanded service described herein, the user device GUI environment is enhanced in a real time manner.

In one or more implementations, an on-demand edged computing deployment service for font support is disclosed, which includes, for instance, on-demand analysis to configure the edge font server by, for instance, detecting or anticipating one or more fonts and/or glyphs required by a user device. Deployment can include running an on-demand edge computing deployment tool (e.g., scriptZ) to deploy (i.e., install) an edged-font server on an edge device, responsive to demand for, for instance, font X in a selected user device. Un-deployment can include running an on-demand edge computing deployment tool (e.g., scriptZ) to un-deploy (deinstall) an edged-font server at an edge device. Advantageously, the glyph-demanded font edge service or process disclosed herein provides, in one or more implementations, a customized edged-font server with selected font-related data according to characteristics of the rendering content. It can be customized, selected and distributed to one or more edge devices for different types of content, as needed.

Another embodiment of a computing environment to incorporate and use one or more aspects of the present invention is described with reference to FIG. 7. As examples, the computing environment may be of various architectures and of various types, including, but not limited to: personal computing, client-server, distributed, virtual, emulated, partitioned, non-partitioned, cloud-based, grid, time-sharing, cluster, peer-to-peer, mobile, having one node or multiple nodes, having one processor or multiple processors, and/or any other type of environment and/or configuration, etc. that is capable of executing a process that, e.g., stores data such as described herein and retrieves and uses that data to provide demand-based deployment of font servers to edge devices as described. Aspects of the present invention are not limited to a particular architecture or environment.

Figure 7:
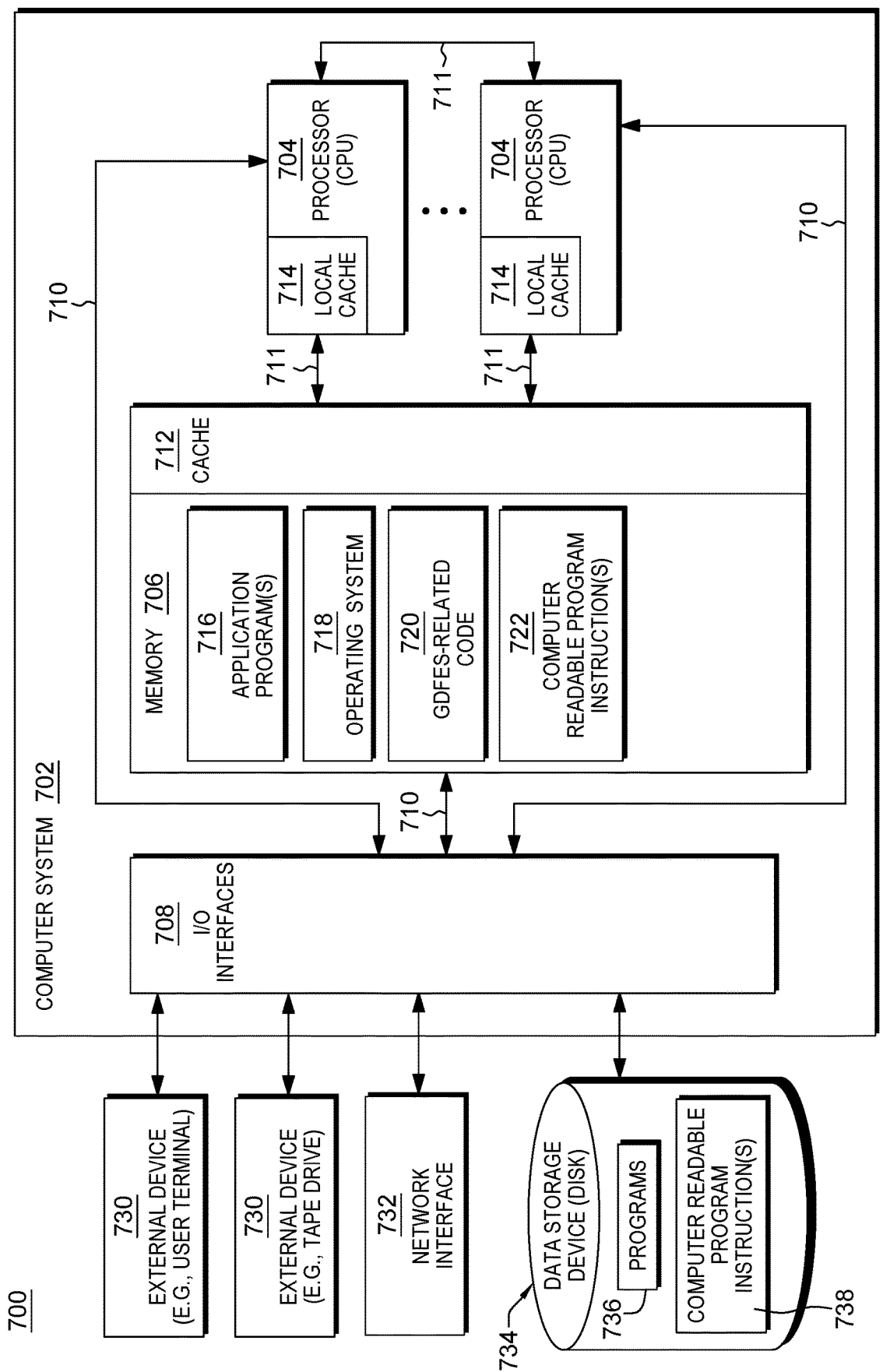
FIG. 7 depicts another example of a computing environment to include and/or user one or more aspects of the present invention.

Referring to FIG. 7, in one example, a computing environment 700 includes, for instance, a computer system 702 shown, e.g., in the form of a general-purpose computing device. Computer system 702 may include, but is not limited to, one or more processors or processing units 704 (e.g., central processing units (CPUs) and/or special-purpose processors, etc.), a memory 706 (a.k.a., system memory, main memory, main storage, central storage or storage, as examples), and one or more input/output (I/O) interfaces 708, coupled to one another via one or more buses and/or other connections. For instance, processors 704 and memory 706 are coupled to I/O interfaces 708 via one or more buses 710, and processors 704 are coupled to one another via one or more buses 711.

Bus 711 is, for instance, a memory or cache coherence bus, and bus 710 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 706 may include, for instance, a cache 712, such as a shared cache, which may be coupled to local caches 714 of one or more processors 704 via, e.g., one or more buses 711. Further, memory 706 may include one or more programs or applications 716, at least one operating system 718, and one or more GDFES-related code(s) 720, which is used in accordance with one or more aspects of the present invention, as well as one or more computer readable program instructions 722. Computer readable program instructions 722 may be configured to carry out one or more functions of embodiments of the invention.

Computer system 702 may communicate via, e.g., I/O interfaces 708 with one or more external devices 730, such as a user terminal, a tape drive, a pointing device, a display, and one or more data storage devices 734, etc. A data storage device 734 may store one or more programs 736, one or more computer readable program instructions 738, and/or data, etc. The computer readable program instructions may be configured to carry out functions of embodiments of aspects of the invention.

Computer system 702 may also communicate via, e.g., I/O interfaces 708 with network interface 732, which enables computer system 702 to communicate with one or more networks, such as a local area network (LAN), a general wide area network (WAN), and/or a public network (e.g., the Internet), providing communication with other computing devices or systems.

Computer system 702 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 702. Examples, include, but are not limited to: microcode, device drivers, redundant processing units, external disk drive arrays, RAID systems, tape drives, and data archival storage systems, etc.

Computer system 702 may be operational with numerous other general-purpose or special purpose computing system environments or configurations. Examples of well-known computing systems, environments, and/or configurations that may be suitable for use with computer system 702 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computing environments described herein are only examples of computing environments that can be used. Other environments, including but not limited to, non-partitioned environments, partitioned environments, cloud environments, distributed environments, non-distributed environments, virtual environments and/or emulated environments, may be used; embodiments are not limited to any one environment. Although various examples of computing environments are described herein, one or more aspects of the present invention may be used with many types of environments. The computing environments provided herein are only examples.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more aspects of one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, additional, fewer and/or other features, constraints, tasks and/or events may be considered. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    one or more computer-readable storage media and program instructions embodied therewith, the program instructions being readable by a processing circuit to cause the processing circuit to perform a method comprising:
        automatically deploying on demand, by a controller executing on a computing resource separate from an edge device and a user device, a font server to the edge device, where the font server is a customized font server to provide font-related data that is currently unavailable at a user device, the automatically deploying on demand comprising:
            predicting, via machine learning, the need for the font-related data that is currently unavailable at the user device, the predicting being based on at least one machine-learning model of a relationship between a plurality of user devices and one or more applications needing one or more glyphs, the font-related data comprising, at least in part, the one or more glyphs;
            generating, by the controller based on the predicting, the font server as executable code customized to provide the font-related data that is currently unavailable at the user device;
        packaging the font server in a container, the container being a single, lightweight executable;
        deploying the container with the font server to the edge device of the computing environment, providing the font server as executable code in the container at the edge device, wherein the edge device is an edge device of a cellular network and is associated with a respective cell tower of the cellular network for wirelessly interfacing with the user device based on the user device being within range of the cell tower; and
        wherein the font server is to be executed on the edge device to provide the font-related data to the user device based on the user device being within range of the cell tower, and wherein the user device is to maintain a demand log of required font-related data needed at the user device, as well as available font data, and missed font data.

2. The computer program product of claim 1, wherein the deploying of the container with the font server to the edge device to facilitate distribution of the font-related data to the user device facilitates rendering of one or more glyphs in a user interface of the user device.

3. The computer program product of claim 1, wherein the automatically deploying on demand is based, at least in part, on monitoring of glyph and font usage of one or more applications of the user device to facilitate identifying the need for the font-related data that is currently unavailable at the user device.

4. The computer program product of claim 1, wherein the automatically deploying on demand is based, at least in part, on monitoring of glyph and font usage of a launching application of the user device to facilitate identifying the need for the font-related data that is currently unavailable at the user device, and wherein the monitoring is further based, at least in part, on monitoring of glyph and font usage of the launching application across one or more other user devices to facilitate customizing the font server to the need for the font-related data that is currently unavailable at the user device.

5. The computer program product of claim 1, further comprising undeploying the font server from the edge device of the computing environment based on the font server not being accessed at the edge device for a period of time.

6. A computer-implemented method comprising:
    automatically deploying on demand, by a controller executing on a computing resource separate from an edge device and a user device, a font server to the edge device, where the font server is a customized font server to provide font-related data that is currently unavailable at a user device, the automatically deploying on demand comprising:
        predicting, via machine learning, the need for the font-related data that is currently unavailable at the user device, the predicting being based on at least one machine-learning model of a relationship between a plurality of user devices and one or more applications needing one or more glyphs, the font-related data comprising, at least in part, the one or more glyphs;

generating, by the controller based on the predicting, the font server as executable code customized to provide the font-related data that is currently unavailable at the user device;

packaging the font server in a container, the container being a single, lightweight executable;

deploying the container with the font server to the edge device of the computing environment, providing the font server as executable code in the container at the edge device, wherein the edge device is an edge device of a cellular network and is associated with a respective cell tower of the cellular network for wirelessly interfacing with the user device based on the user device being within range of the cell tower; and wherein the font server is to be executed on the edge device to provide the font-related data to the user device based on the user device being within range of the cell tower, and wherein the user device is to maintain a demand log of required font-related data needed at the user device, as well as available font data, and missed font data.

7. The computer-implemented method of claim 6, wherein the deploying of the container with the font server to the edge device to facilitate distribution of the font-related data to the user device facilitates rendering of one or more glyphs in a user interface of the user device.

8. The computer-implemented method of claim 6, wherein the automatically deploying on demand further is based, at least in part, on monitoring of glyph and font usage of one or more applications of the user device to facilitate identifying the need for the font-related data that is currently unavailable at the user device.

9. The computer-implemented method of claim 6, wherein the automatically deploying on demand further is based, at least in part, on a monitoring of glyph and font usage of a launching application of the user device to facilitate identifying the need for the font-related data that is currently unavailable at the user device, and wherein the monitoring is further based, at least in part, on monitoring of glyph and font usage of the launching application across a plurality of user devices to facilitate customizing the font server to the need for the font-related data that is currently unavailable at the user device.

10. The computer-implemented method of claim 6, further comprising undeploying the font server from the edge device of the computing environment based on the font server not being accessed at the edge device for a period of time.

11. A computer system for facilitating processing within a computing environment, the computer system comprising:

a memory; and at least one processor in communication with the memory, wherein the computer system is configured to perform a method, the method comprising:

automatically deploying on demand, by a controller executing on a computing resource separate from an edge device and a user device, a font server to the edge device, where the font server is a customized front server to provide font-related data that is currently unavailable at a user device, the automatically deploying on demand comprising:

predicting, via machine learning, the need for the font-related data that is currently unavailable at the user device, the predicting being based on at least one machine-learning model of a relationship between a plurality of user devices and one or more applications needing one or more glyphs, the font-related data comprising, at least in part, the one or more glyphs;

generating, by the controller based on the predicting, the font server as executable code customized to provide the font-related data that is currently unavailable at the user device;

packaging the font server in a container, the container being a single, lightweight executable;

deploying the container with the font server to the edge device of the computing environment, providing the font server as executable code in the container at the edge device, wherein the edge device is an edge device of a cellular network and is associated with a respective cell tower of the cellular network for wirelessly interfacing with the user device based on the user device being within range of the cell tower; and wherein the font server is to be executed on the edge device to provide the font-related data to the user device based on the user device being within range of the cell tower, and wherein the user device is to maintain a demand log of required font-related data needed at the user device, as well as available font data, and missed font data.

12. The computer system of claim 11, wherein the deploying of the container with the font server to the edge device to facilitate distribution of the font-related data to the user device facilitates rendering of one or more glyphs in a user interface of the user device.

\* \* \* \* \*